No. 638,090. Patented Nov. 28, 1899.
P. F. & A. F. BRYCE.
BREAD MAKING MACHINE.
(Application filed Mar. 21, 1898.)
(No Model.)
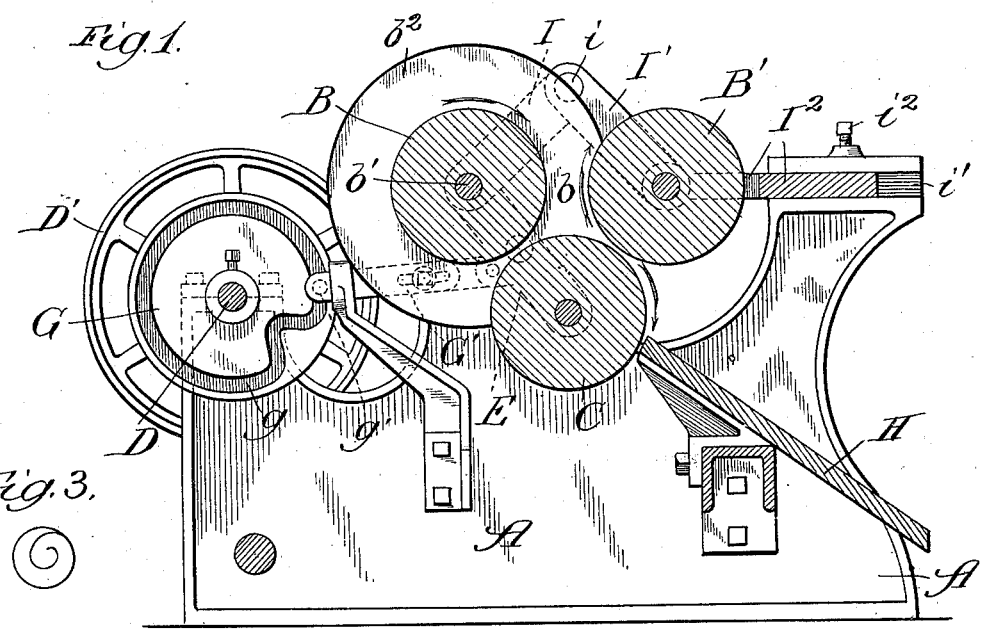
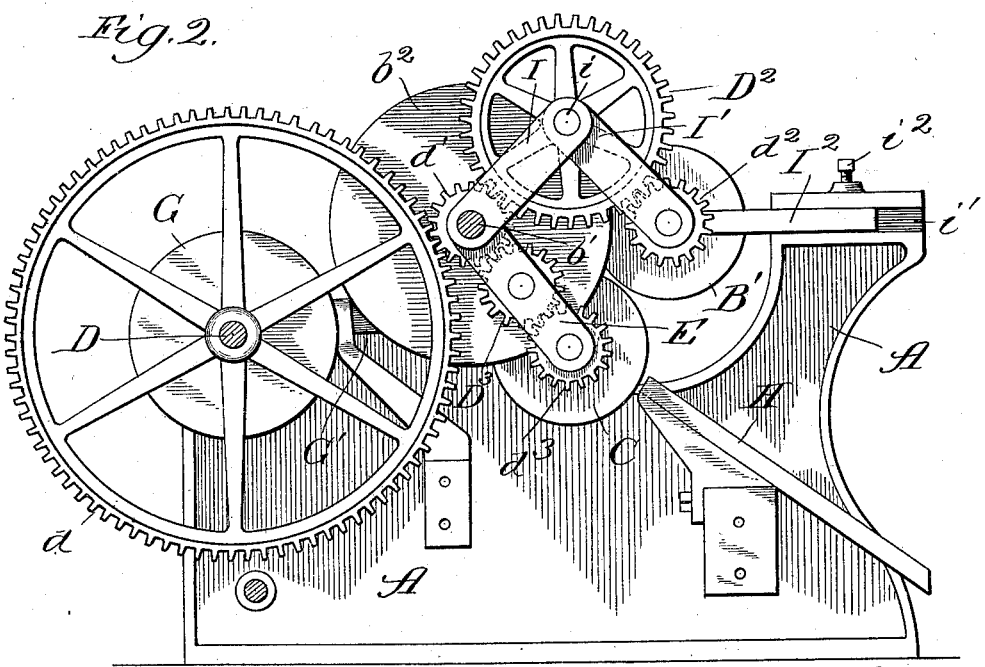
Witnesses:
Inventors:
Peter F. Bryce,
Alexander F. Bryce,
By Banning & Banning & Sheridan
Attys

UNITED STATES PATENT OFFICE.

PETER F. BRYCE AND ALEXANDER F. BRYCE, OF CHICAGO, ILLINOIS, ASSIGNORS TO THE BRYCE BAKING COMPANY, OF SAME PLACE.

BREAD-MAKING MACHINE.

SPECIFICATION forming part of Letters Patent No. 638,090, dated November 28, 1899.

Application filed March 21, 1898. Serial No. 674,625. (No model.)

*To all whom it may concern:*

Be it known that we, PETER F. BRYCE and ALEXANDER F. BRYCE, citizens of the United States, residing at Chicago, in the county of Cook and State of Illinois, have invented certain new and useful Improvements in Bread-Making Machines, of which the following is a specification.

Our invention relates to that class of machines in which the dough is fed in in the desired amounts and is rolled or formed into loaves for baking, and particularly to that type of machines for the formation of round or cylindrical loaves of bread.

The object of our invention is to provide a simple, economical, and efficient machine for rolling a quantity of dough into cylindrical form necessary for forming a loaf of bread; and the invention consists in the features, combinations, and details of construction hereinafter described and claimed.

In the accompanying drawings, Figure 1 is a vertical longitudinal sectional elevation of a machine constructed in accordance with our improvements; Fig. 2, an end elevation of the same, and Fig. 3 a detail view of a loaf of bread as formed by the machine.

In constructing a machine in accordance with our improvements we make a frame A of the desired size, shape, and strength to hold its movable and other parts in operative position.

In order to roll a sheet or lump of dough into the cylindrical form required before baking into bread, two main forming-rolls B and B' are provided, their peripheral surfaces being situated a desired distance apart, so as not to contact each other and to form a space $b$, through which the sheet or lump of dough may be inserted. In order to prevent the sheet or lump of dough from falling through, to keep it in contact with the other rolls, and to roll it over and over again to form the desired cylindrical shape of a round loaf of bread, an auxiliary roll C is provided and located opposite the opening formed between the two main rolls, so that the bread as it enters will be first contacted by it, forced into contact with the upper rolls, and formed into a cylindrical loaf of dough. The rolls are geared together, so that they rotate in the same direction and in such manner that the lump or sheet of dough is rolled up in the involute or spiral shape and kept from passing between the rolls. In Fig. 2 we have shown the gearing for operating these rolls, in which D is the main driving-shaft, provided with a pulley D', a spur-gear $d$ engaging with a pinion $d'$, which drives the main roll B. By means of an intermediate gear $D^2$ power and motion are transmitted to the pinion $d^2$, which operates the second main roll B', and by means of a second intermediate gear $D^3$ power and motion are transmitted to the pinion $d^3$ on the auxiliary roll. It will thus be seen from an examination of the drawings that the rolls all rotate in the same direction, thereby facilitating the formation of a piece of dough into a cylindrical shape.

After the loaf of dough has been formed it is necessary to discharge it between the rolls. In order to accomplish this result, the auxiliary roll is mounted upon swinging links E, pivoted at or about the shaft $b'$ of the first main roll, so that in swinging it is moved concentric with the center of the main roll. To operate these links, a face-cam G is provided, which has its groove $g$ engaging with a pin $g'$ on the pitman G', which is pivotally connected to the swinging links, so that as the main shaft is rotated the pitman is operated at predetermined times and the loaf of dough allowed to drop out from between the rolls onto a discharge-chute H, by which it may be carried to any desired point.

To make different-sized loaves of bread and for other reasons, such as the regulation of the particular size of any one loaf of bread, it is desirable to have one or both of the main rolls adjustably mounted. In order to accomplish this result, we preferably mount the main rolls on bars I and I', which are pivoted together at $i$ at the point where the intermediate gear $D^2$ is mounted. These links form, as it were, a flexible frame, in which the rolls are rotatably mounted, and in order to secure the necessary adjustment one of the links is provided with a bar $I^2$, which is adjustably mounted in a suitable groove $i'$ of the frame, while a set-screw $i^2$ is used for holding it in any desired position. By this arrangement of construction it will be seen that the main rolls may be located at any desired distance apart and adjusted, whenever necessary, without in any way interfering with the transmission of power to such rolls.

In order to keep the roll of dough between the forming-roll and to limit its length, one of the main rolls is provided with flanges $b^2$, which practically overlap the opening between the rolls and at the end thereof. These flanges can be formed integral with the roll, if desired, or may be mounted so as to have an independent rotation therewith or mounted loosely in such manner as not to rotate at all.

In operation the sheet or piece of dough is dropped between the forming-rolls through the opening $b$, and as it contacts the lower roll is thrown against the main roll B' and curved upward. Falling back of its own weight it contacts the main roll B and is again driven into contact with the lower roll or rolled upon itself, the operation continuing until the compact mass in the shape of a cylindrical loaf of dough is formed. The auxiliary roll is then operated, so as to liberate the loaf of dough and allow it to slide down the discharge-chute and be conveyed to a suitable point for rising and baking.

From an inspection of the drawings and the foregoing description of construction and operation it will be seen that at least three rolls are so arranged as to provide a space between them—that is, these rolls are practically arranged at points about a central space and run in the same direction, so as to facilitate the forming of a loaf of bread. We prefer for convenience and for economy in construction and operation to use but three rolls; but it will be seen that five or more rolls may be used, placed about the center, and accomplish the same result, with slight changes in mechanical details.

While we have described our invention with more or less minuteness as regards details of construction and arrangement and as being embodied in certain precise forms, we do not desire to be limited thereto unduly any more than is pointed out in the claims. On the contrary, we contemplate all proper changes in form, construction, and arrangement, the omission of immaterial elements, and the substitution of equivalents, as circumstances may suggest or necessity render expedient.

We claim—

1. In a machine for forming a cylindrical loaf of dough, the combination of two main forming-rolls, an auxiliary roll mounted adjacent to the other two rolls so as to form a space in which a piece of dough may be received, and means for vibrating or moving the auxiliary roll so as to assist in discharging the formed loaf of dough, substantially as described.

2. In a machine for forming a cylindrical loaf of dough, the combination of two main forming-rolls rotatably mounted so as to provide a space between their peripheral surfaces, an auxiliary roll mounted opposite the space formed between the main forming-rolls, and means for vibrating or oscillating the auxiliary roll into and out of operative position to form and discharge the loaf of dough, substantially as described.

3. In a machine for forming a cylindrical loaf of dough, the combination of two main forming-rolls, means for laterally adjusting one of such rolls, an auxiliary roll mounted opposite the space formed by the main rolls, and means for vibrating the auxiliary roll to assist in discharging the loaf of dough, substantially as described.

4. In a machine for forming a cylindrical loaf of dough, the combination of two main forming-rolls, a flexible frame upon which such forming-rolls are adjustably mounted to regulate the size of the loaf of dough to be formed between the same, an auxiliary roll mounted opposite the space formed by the two main rolls, and means for vibrating the auxiliary roll so as to assist in discharging the formed loaf of dough, substantially as described.

5. In a machine for forming a cylindrical loaf of dough, the combination of two main forming-rolls, a flexible frame upon which the forming-rolls are adjustably mounted, gear mechanism mounted on the flexible frame so as to drive the rolls in any of their various positions, an auxiliary roll mounted opposite the space formed between the two main rolls, and cam-and-link mechanism for vibrating the auxiliary roll so as to assist in discharging the formed loaf of dough, substantially as described.

6. In a machine for forming a cylindrical loaf of dough, the combination of two main forming-rolls, a flexible frame upon which the forming-rolls are adjustably mounted, gear mechanism mounted on the flexible frame so as to drive the rolls in any of their various positions, an auxiliary roll mounted opposite the space formed between the two main rolls, cam-and-link mechanism for vibrating the auxiliary roll so as to assist in discharging the formed loaf of dough, and a discharge-chute adapted to receive the formed loaf of dough and discharge it at the desired point, substantially as described.

7. In a machine for forming a cylindrical loaf of dough, the combination of several rolls the axes of which are arranged around a central point so as to receive and contact a sheet of dough and roll it into a substantially cylindrical form, and means for rotating two or more of the rolls in the same direction, substantially as described.

8. In a machine for forming a cylindrical loaf of dough, the combination of several rolls the axes of which are arranged around a central point so as to receive and contact a sheet of dough and roll it into a substantially cylindrical form, means for rotating two or more of the rolls in the same direction, and means for closing the ends of the space between the rolls to limit the length of the loaf of dough, substantially as described.

PETER F. BRYCE.
ALEXANDER F. BRYCE.

Witnesses:
 THOMAS F. SHERIDAN,
 THOMAS B. McGREGOR.